July 6, 1948. J. FÜLLEMANN 2,444,644
SPEED RESPONSIVE REGULATION OF
TURBO-SUPERCHARGED ENGINES
Filed July 31, 1943 3 Sheets-Sheet 3
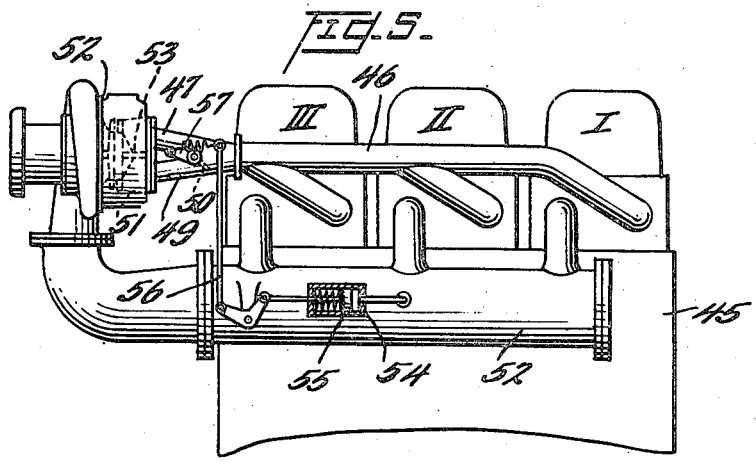
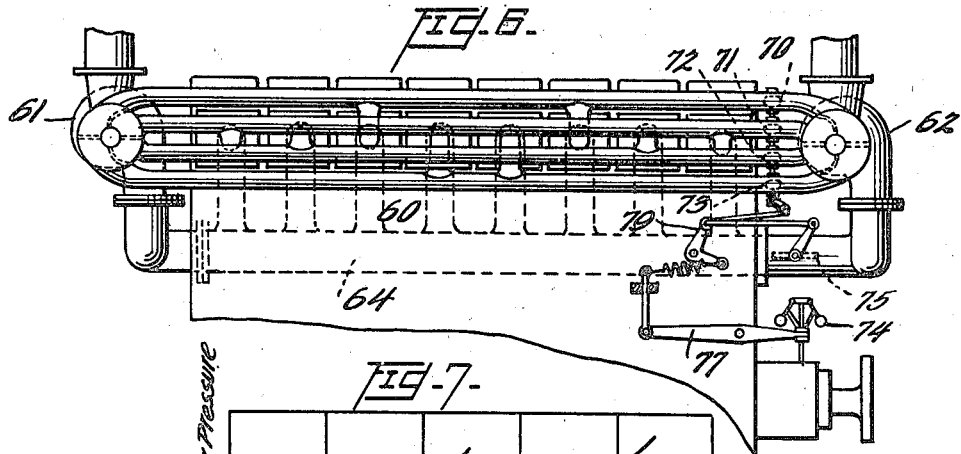
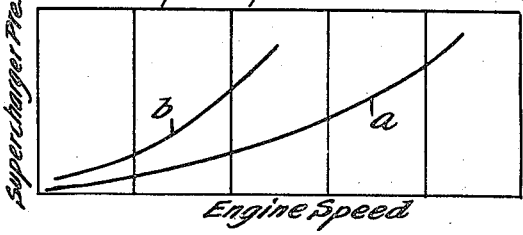
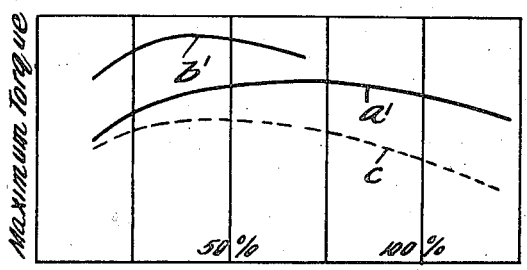
Inventor
Johann Füllemann
By Walter H. Young
Attorney Patented July 6, 1948

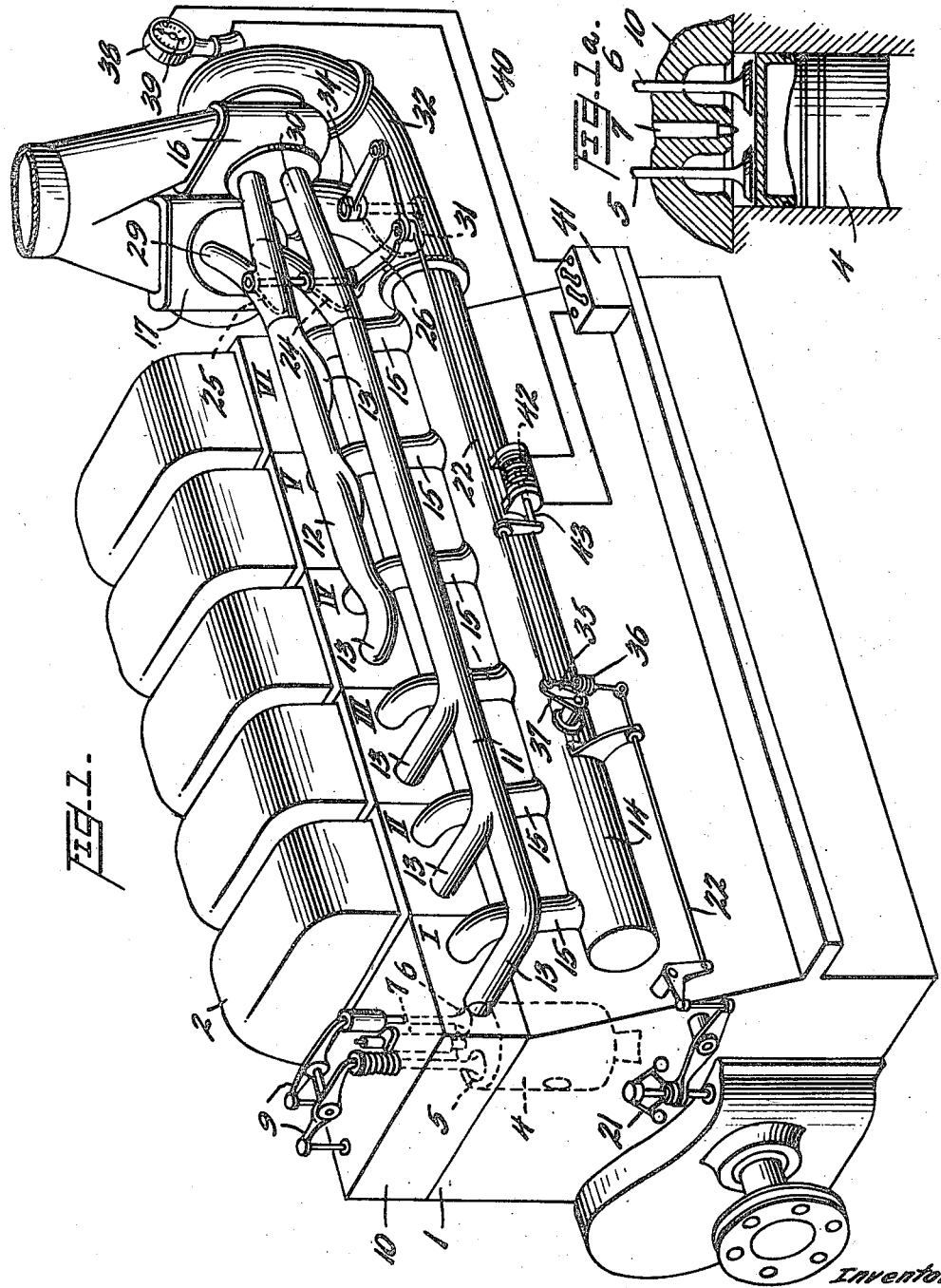

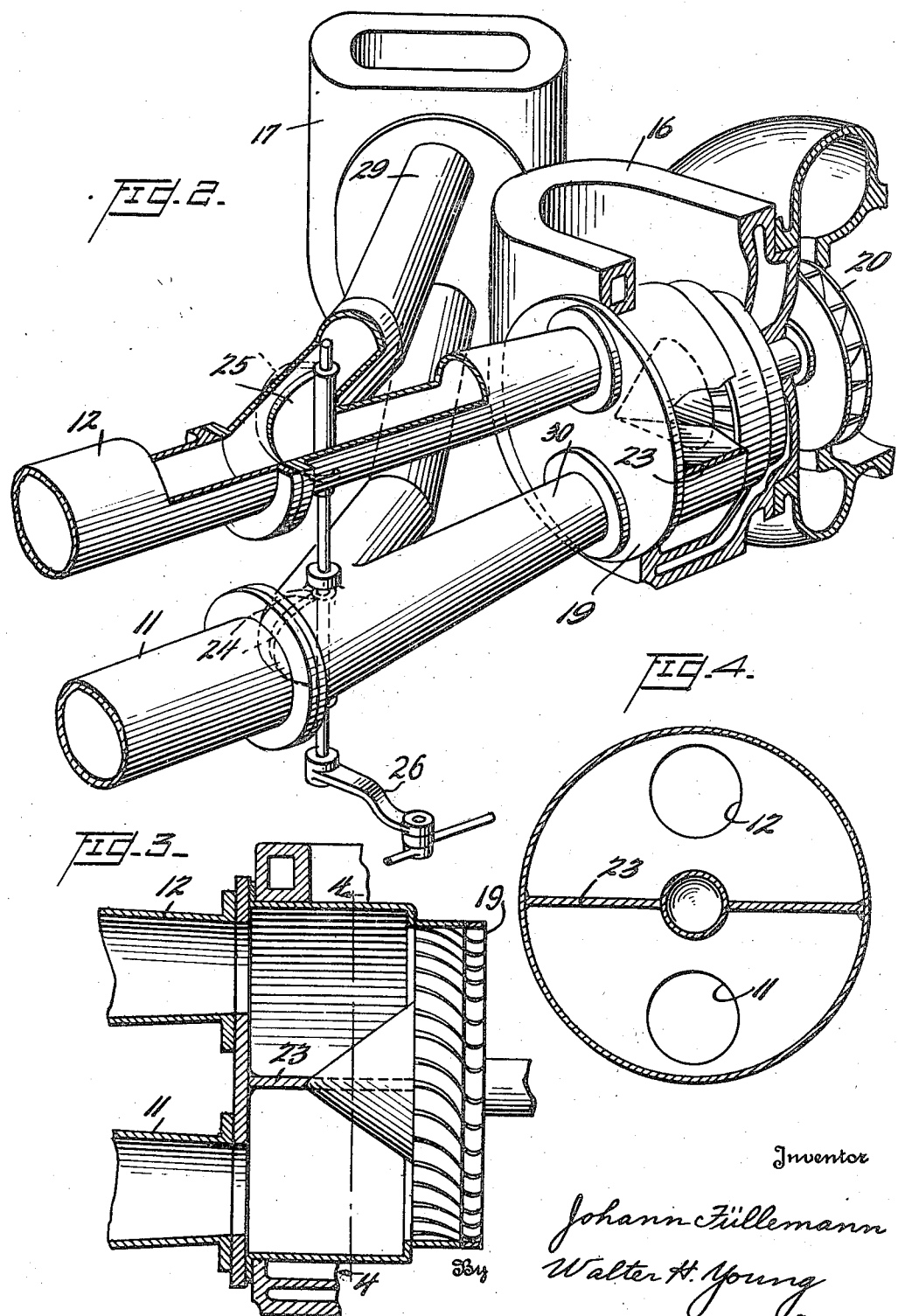

2,444,644

UNITED STATES PATENT OFFICE 2,444,644

SPEED RESPONSIVE REGULATION OF TURBOSUPERCHARGED ENGINES

Johann Füllemann, Washington, D. C., assignor to Alfred Buchi, Winterthur, Switzerland Application July 31, 1943, Serial No. 496,926

4 Claims. (Cl. 60—13)

This invention relates to improvements in power plants of the type comprising an internal combustion engine which is supercharged with air or gaseous charge under pressure furnished by a rotary centrifugal blower drivingly connected with an exhaust-gas-driven turbine to which the exhaust gases from the engine are conducted, the turbine and blower not being mechanically connected with the engine. Such engines, in service, particularly for automotive drive and for propelling ships of the type which are required to be especially maneuverable, are sometimes subjected to suddenly applied loads while the engine is operating at comparatively low speed, for instance, half speed, or perhaps at idling speed, or possibly when the engine is operating at full or nearly full speed without load. Under any of these conditions, the amount of energy in the exhaust gases available for driving the turbine means and blower means is comparatively small. Since the turbine means and blower means are designed to handle the larger air and gas capacity corresponding to full load and speed operation, the turbine offers passages which are too large for the small gas quantities at low-speed operation and, consequently, the speed of the turbocharger is less than is required for maintaining the air pressure up to the full pressure required for the engine to carry maximum torque at slow speed and also less than is required for the engine to suddenly carry a heavy load at full speed.

It is an object of this invention to provide regulating arrangements whereby the turbocharging means can be kept up to the full speed or substantially the full speed required for furnishing air under the pressure required by the engine in case of the application of sudden loads at part speed or full speed.

A further object of this invention is to provide regulating arrangements whereby a turbocharging means, adapted for supplying air under substantially full pressure at low loads or speeds, can also supply the air required for the engine to pull high torque at part speed or full speed without the turbocharging means being overspeeded by the additional amount of driving energy which would then be furnished under the higher load or speed conditions of the engine.

A further object of this invention is to provide regulating means for the turbocharging means which will cause said means to operate within two or more best efficiency ranges under two or more radically different load conditions of the engine.

A further object of this invention is to provide a safety control mechanism influenced by the speed of the blower means for taking over from the engine speed regulated mechanism the control of the position of the exhaust gas control devices which control the delivery of exhaust gases to the several turbine nozzle groups, whereby, when an air blower exceeds a predetermined safe speed, delivery of exhaust gas to both turbine means is assured.

Still another object of the invention is to provide a safety control device operated by the pressure of the air or gaseous charge delivered by one or more blower means for opening the exhaust gas passages to more turbine nozzle areas when the air pressure exceeds a predetermined pressure indicating a predetermined blower speed.

The invention is particularly intended and applicable to power plant systems of the type known as the "Buchi turbocharging system," which has for its principal features that the charging and exhaust valves are both maintained open at the end of the exhaust period whereby relatively cool air blows through the combustion space and cools the internal parts, and the exhaust pipe arrangements are such that the exhaust impulses from one exhausting cylinder will not interfere with the air being blown through another cylinder during the scavenging period. In such systems, in many instances more than one exhaust pipe is provided in order to separate the exhaust impulses to prevent interference with the scavenging of one cylinder by the exhaust impulses of another cylinder.

According to the present invention the exhaust pipes may be divided into branches in advance of their entry into the turbine means, and the nozzles of the turbine means may be separated into groups by division walls forming compartments, and each branch of the exhaust pipes would be connected with only one of said compartments. In order to control the flow of exhaust gases to the various nozzle compartments, regulating means may be provided for controlling flow through the various exhaust pipe branches.

Other objects and advantages of the invention will become apparent from an inspection of the accompanying drawings and description thereof which follows.

In the drawings:

Fig. 1 is a perspective view of a power plant including an engine and turbocharging means and the control mechanism therefor;

Fig. 1a is a diagrammatic vertical sectional view of one cylinder of the engine taken in a plane extending axially of the engine;

Fig. 2 is an enlarged perspective view partially in section of the turbocharging means and part of the controlling mechanism for the engine exhaust gases;

Fig. 3 is a diagrammatic axial sectional view of the turbine part of a turbocharger illustrating the division of the nozzle means into groups;

Fig. 4 is a diagrammatic transverse sectional view of the turbine means taken on the line 4—4 of Fig. 3;

Fig. 5 is a more or less diagrammatic representation of a power plant comprising a three-cylinder engine having only one exhaust pipe connected with turbocharging means, the turbine nozzles of which are divided into two groups and the engine exhaust pipe having two branches each connected with a separate group;

Fig. 6 is a diagrammatic representation of a modified arrangement of a power plant including an eight-cylinder engine and turbocharging means and control means therefor and showing control devices for the exhaust gas admission to the turbine means;

Fig. 7 shows curves illustrating the charging pressure at various speeds of a normally turbocharged engine and an engine controlled according to the present invention; and Fig. 8 shows curves illustrating the comparative maximum torque at various engine speeds of a non-turbocharged engine, a normally turbocharged engine, and an engine having controls according to the present invention.

In the power plant illustrated in Fig. 1 the reference numeral 1 indicates an engine which, for purposes of illustration, is shown as a four-stroke-cycle Diesel engine. The engine has six cylinders and, for illustrating the valve arrangements, the cover of cylinder I is omitted and in the first cylinder the piston 4 and valves 5 and 6, as well as an injection nozzle 7, are shown in dotted lines. The valve actuating rocker arms 9 are also illustrated over the cylinder head 10. It will be observed that the engine is equipped with two exhaust pipes 11 and 12, the first of which is connected with the first three cylinders, that is, cylinders I, II, and III, and the latter of which is connected with the last three cylinders, that is, cylinders IV, V, and VI. In this case it is assumed that the engine has a firing order of 1—5—3—6—2—4; and, accordingly, it will be observed that alternately exhausting cylinders are connected by exhaust elbows 13 to the same exhaust pipes, whereas any cylinder which immediately follows another cylinder in its exhaust period is connected to a different exhaust pipe. All of the air valves 6 are connected with air supply pipe 14 through individual air connection elbows 15. In Fig. 1a the piston and valves are shown in the positions they assume at the top dead center following the exhaust stroke, and it will be observed that at this instant both the air and exhaust valves are open. Consequently, at this time the air under pressure will blow into the combustion space through the air valve and out through the exhaust valve. This is possible by reason of the fact that no other cylinder connected to the same exhaust pipe is exhausting at this time and the pressure impulse in the exhaust pipe created by the previously exhausting cylinder will have fallen to a pressure lower than the scavenging air pressure or even to approximately atmospheric pressure. The present invention is not limited to an engine operating according to the system just described, but can also be applied to two-stroke-cycle engines and to engines operating on carbureted charge.

For supplying the charging and scavenging air under pressure, the engine is provided with turbocharging means which, according to the embodiment shown in Fig. 1, comprises two turbochargers 16 and 17. Each of these turbochargers includes turbine means 19 and blower means 20 (see Fig. 2).

In Fig. 2 it is shown that one branch of each of the exhaust pipes 11 and 12 is connected to the turbine means of each turbocharger, and, also, it is desired to call attention to the fact that in the chamber preceding the turbine nozzles a division wall 23 is provided for separating the turbine entrance chamber so that gases from the respective pipes will not have access to the other pipe until after passing through the turbine nozzles, at which time it is too late for the pressure fluctuations in the respective pipes to return through the nozzles and affect the pressure in the other pipe. This arrangement is also shown in Figs. 3 and 4, which are longitudinal and transverse sectional views of the turbine means and illustrate the division wall 23 and the branch pipes connected to the turbine inlet chamber on opposite sides of said division wall.

Normally, when an engine is supercharged by turbocharging means, only a single turbocharger would be provided and all of the exhaust gases from the engine would be supplied to the turbine means either all in one compartment or possibly into compartments separated by division walls. In such previously known power plants the turbocharger would be so designed with respect to the controlling features of its turbine and blower that when the engine would be operating at full speed and load, the turbocharger would then be operating at the speed at which substantially its highest efficiency would be obtained which is comparatively close to its maximum allowable speed. When such a previously known engine would be operating at low speed or low load, the quantity of exhaust gas supplied to the turbine means would be considerably less than at full engine speed and load and would be insufficient to drive the turbocharger at the speed at which it would operate most efficiently, and, consequently, the pressure of the air supplied by the blower would be low and inadequate to supercharge the engine sufficiently to operate with high torque at low speed, or to maintain full speed if a heavy load were suddenly thrown on the engine. If the turbocharger for such previously known engine should be so designed that it would run at a higher and more efficient speed when the engine would be operating at low speed or low load, then, if the engine should be speeded up to normal speed or its load considerably increased and thereby supply larger quantities of exhaust gas to the turbocharger, the turbocharger would exceed its maximum speed limit and might possible explode or be otherwise damaged.

In order to enable the engine of a power plant system of the kind herein referred to, to carry high torque at low speed and also at normal speed, according to the present invention, control means are provided which are influenced by the engine operating conditions to supply the exhaust gases to more or less of the nozzles of the turbine means of the turbocharging means. As illustrated in Figs. 1–3, the control means is influenced by the engine speed governor 21 through various levers and linkage 22 to supply all of the exhaust gases to one turbocharger when the engine is operating below a predetermined speed and to supply part of the exhaust gases to both turbine means when the engine is operating above a predetermined speed. This control means includes valves 24 and 25 located in exhaust pipes 11 and 12 respectively and both of which are controlled by lever 26 which is connected with the linkage 22 previously mentioned. These valves are located in the exhaust pipes immediately before the points where the exhaust pipes are divided into two branches by breeches pipes 29 and 30. The governor 21 and linkage 22 also operate an air control valve 31 which is located at the junction of air pipes 32 and 34 of the blowers of turbochargers 16 and 17 respectively. In order that these valves shall always be in a position to completely close off the exhaust pipes to one of the turbochargers and the air pipe from said turbocharger, or shall be in a position to open these pipes to and from the turbochargers equally, a spring-controlled snap-over device 35 is inserted in the linkage 22. It will be obvious from inspection of this device that if the speed of the engine should be reduced sufficiently, the axis of spring 36 would finally pass the line of the axis of the lever 37 of the snap-over device 35, in which event the lever would snap to its opposite position, thereby causing exhaust gas valves 24 and 25 and air valve 31 to close the exhaust gas and air connection pipes to and from turbocharger 17. Valves 24 and 25 are shown in dash-dot lines in Fig. 2 in this closed position. In such case all of the gases from the engine would be delivered to turbocharger 16 and the quantity of gases would be sufficient to enable the single turbocharger 16 to maintain a speed at which efficient operation would be attained. Since the pressure of the air in the air manifold is, to a large extent, dependent mutually on the peripheral speed of the turbocharger and on the reduced amount of air used by the engine at the reduced speed, the pressure in the air manifold will be considerably higher with only one turbocharger in operation than it would have been if both turbochargers had continued in operation, and the charging pressure of the engine is thereby made higher. This, therefore, enables the engine to operate with high torque at low speed. The torque which can be pulled by the engine under these circumstances is considerably higher than would have been the case if the engine had continued to be supplied by air by both turbochargers 16 and 17 operating at low speed, or by a single larger turbocharger operating at low speed and out of its best efficiency range.

In order to guard against accidents in case for any reason the engine speed governor 21 should not properly act through the linkage 22 to open the valves 24, 25, and 31 when the engine speed exceeds a certain limit, a speed responsive device or tachometer 38 is attached to the rotor of turbocharger 16. The tachometer 38 has a switch element which may be the same as the pointer 39 thereof which completes an electric circuit 40 energized by any suitable source, such as battery 41, and energizing solenoid 42 to attract its armature 43 which is connected to the linkage and positively pull the linkage controlling the valves to the right in Fig. 1 and thus positively open the valves. When the valves are open, part of the gases will be fed to turbocharger 17, whereby turbocharger 16 will automatically reduce its speed below the danger point.

Fig. 5 illustrates a modified embodiment of the invention in the form of a power plant comprising a three-cylinder engine 45, the cylinders thereof being indicated by numerals I, II, III. The engine may be of any type, either carbureted, Diesel, or semi-Diesel, and either two- or four-stroke-cycle. For this engine only one exhaust pipe 46 is provided. The exhaust pipe is divided into two branches 47 and 49 by a breeches pipe, and at the junction of these branches a control valve 50 is indicated in dotted lines. The valve is shown in its lower position in which it closes off the branch pipe 49 leading to the lower compartment 51 of the turbine inlet casing which is divided from the upper compartment 52 by division wall 53, shown in dotted lines. This embodiment of the invention relies on the air pressure in the air manifold alone for control of the exhaust gas control valve 50, and no air control valve is required. As has been previously mentioned herein, the pressure of the air in the air manifold will depend on the speed of the engine and the peripheral speed of the air impeller. Consequently, when the engine speed is reduced and the amount of exhaust gas passing to the turbine is correspondingly reduced, the turbocharger would tend to slow down, thereby bringing the speed of the air impeller into a comparatively inefficient range whereby the amount and pressure of the air supplied would be excessively reduced and the air pressure in air manifold 52 would be lower than would be required for supercharging the engine sufficiently to enable it to carry high torque at reduced speed, or to suddenly carry heavy load at full speed. In order to avoid this difficulty, a pressure responsive device 54 is provided connected with the air manifold and having a piston 55 connected with linkage and levers 56 and also including a snap-over device 57, resembling that described in connection with Fig. 1, for entirely closing or entirely opening valve 50 to supply the gas to only one of the compartments of the turbine inlet or else to both of said compartments. In a certain sense, the pressure responsive device 54 is also responsive to the turbocharger rotor speed, since the air pressure is, to a large extent, also dependent on the turbocharger rotor speed.

In Fig. 6 the exhaust and charging arrangements of an eight-cylinder engine having two turbochargers is diagrammatically illustrated. The engine casing is indicated by reference numeral 60 and the turbochargers by numerals 61 and 62 respectively. The engine is provided with four exhaust pipes, each of which is connected with both turbocharger turbines. When both turbochargers are in operation, the air is supplied to a mutual air manifold 64 which in this case may be located on the opposite side of the engine from the exhaust pipes. For an eight-cylinder engine employing the Buchi system of turbocharging, as illustrated in U. S. Patent No. 1,895,538 and as previously discussed herein in connection with Fig. 1, the cylinder exhaust ports should be connected to the exhaust pipes in such combinations or arrangements that the exhaust impulse of one cylinder will not interfere with the scavenging of another cylinder connected to the same pipe. In the present instance, the cylinders are connected to the four exhaust pipes in pairs as follows: I and VIII; II and VII; III and VI; and IV and V. In this embodiment complete shut-off valves for the exhaust pipes at one end of the engine are provided, these being designated by numerals 70, 71, 72, and 73, and the air valve is indicated by numeral 75. These valves are controlled from the engine speed governor 74 through linkage and levers 77, which includes a snap-over device 79 resembling the snap-over device 35 described in connection with Fig. 1. When the speed of the engine falls below a predetermined rate, the engine governor will actuate the linkage in such manner as to cause snap-over device 79 to shift to the opposite position and close the valves 70, 71, 72, 73, and 75. When the valves are closed, all of the gases from the engine must then pass to the left, as viewed in Fig. 6, to the turbine part of turbocharger 61. The turbine inlet casing of this turbine is divided into four compartments by division walls in order to keep the exhaust gas impulses of the various exhaust pipes separated. When the turbo-charger 61 receives all of the exhaust gases, even though the engine is operating at reduced speed, the speed of the turbocharger will increase, thereby increasing the air pressure in air manifold 64, and the pressure of the charging air supplied the engine is thereby increased so as to enable the engine to pull high torque at the low speed.

Fig. 7 of the drawings shows curves in which supercharging pressure is plotted against the engine speed for a normally turbocharged engine and for an engine turbocharged in accordance with the present system. The curve $a$ indicates the supercharging pressure of a normally turbocharged engine at various engine speeds, and the curve $b$ indicates the supercharging pressure of an engine according to the present invention operating at low speed. It is to be observed that the air pressure at the low speeds according to the present invention is considerably higher than for a normally turbocharged engine, whereby the quantity of air furnished will be larger and the torque the engine is able to pull will be greater.

Fig. 8 shows several curves indicating maximum torque with respect to engine speed for an unsupercharged engine, a normally turbocharged engine, and an engine turbocharged according to the present invention and operating at low speeds. The curve $a'$ shows the maximum torque of a normally turbocharged engine; the curve $b'$ the maximum torque of an engine turbocharged according to the present invention; and the curve $c$, shown in dotted lines, the maximum torque of an unsupercharged engine.

When the engine speed passes beyond the limit or extent of the curves $b$ and $b'$ in Figs. 7 and 8, the control mechanism previously described will shift the control valves in such way that both turbochargers or sections of the nozzles of the turbocharging means will be supplied with exhaust gases, whereby the engine will then continue its operation as a normally turbocharged engine at the higher speeds.

In all the embodiments of the invention the operating mechanism may be so proportioned and adjusted that the shifting of the control valves may occur at different engine speeds or air pressures, according to whether the valves are being opened or closed, this being possible merely by appropriately changing the angle of one arm of the bell crank lever of the snap-over device.

It is to be understood that the mechanical arrangements herein illustrated for controlling the supply of exhaust gases to the turbocharger means and the air flow from the blower are shown merely by way of illustration, and that the invention is not limited to any particular means or devices.

I claim:

1. In a turbo-supercharging system for internal combustion engines to be operated under widely varying speed ranges especially adapted for delivering high torque at low speed, the combination of a plurality of exhaust-gas-driven turbo-chargers each comprising exhaust gas turbine means and air blower means driven thereby, air delivery conduits connecting the blower means and the engine for conducting compressed air to the engine from the blower means in parallel, exhaust gas conduits having a separate connection with each turbine means for conducting the engine exhaust to the several turbine means in parallel, a valve system in the conduits for controlling the flow of exhaust gases to the turbine means, valve operating mechanism connected to the engine and operating in response to engine speed to cut off the flow of exhaust gas to certain of the turbine means, at low engine speed, and to deliver the entire exhaust gas supply to the remaining turbine means so that the speed thereof and the speed of the blower means driven thereby is adequate to deliver air at higher pressure and in larger volumes at low engine speed than would be possible with all turbine and blower means operative.

2. In a turbo-supercharging system for internal combustion engines to be operated under widely varying speed ranges especially adapted for delivering high torque at low speed, the combination of a plurality of exhaust-gas-driven turbo-chargers each comprising exhaust gas turbine means and air blower means driven thereby, air delivery conduits connecting the blower means and the engine for conducting compressed air to the engine from the blower means in parallel, nozzles associated with each turbine means and a chamber for conducting exhaust gas to the nozzles, means dividing the chamber into compartments each supplying a limited number, less than all, of the nozzles, exhaust gas conduits having a separate connection with each compartment, a valve system in the conduits for controlling the flow of exhaust gases to the several compartments, valve operating mechanism connected to the engine and operating in response to engine speed to cut off the flow of exhaust gas to all of the compartments of one of the turbine means, at low engine speed, and to divert the exhaust gas supply to the compartments of the remaining turbine means so that the speed of the turbine means and the speed of the blower means driven thereby is adequate to deliver air at higher pressure and in larger volumes at low engine speed than would be possible with all turbine and blower means operative.

3. In a turbo-supercharging system for internal combustion engines to be operated under widely varying speed ranges especially adapted for delivering high torque at low speed, the combination of a pair of exhaust-gas-driven turbochargers each comprising an air blower and an exhaust gas turbine, having nozzles, for driving the air blower, air delivery conduits connecting the blowers and the engine for conducting compressed air to the engine from the blowers in parallel, a chamber associated with each turbine to conduct exhaust gas to its nozzles, a wall dividing the chamber into a plurality of compartments each adapted to conduct exhaust gas to a limited number of the nozzles of its turbine, exhaust gas conduits having a separate connection with each compartment, a valve system in the conduits for controlling the flow of exhaust gases to the several compartments of both turbines, valve operating mechanism connected to the engine and operating in response to engine speed to cut off the flow of exhaust gas to all of the compartments of one turbine, at low engine speed, and to divert the entire exhaust gas supply to the compartments of the other turbine so that the speed thereof and the speed of the blower driven thereby is adequate to deliver air at higher pressure and in larger volumes at low engine speed than would be possible with both turbines and blowers operative.

4. In a turbo-supercharging system for internal combustion engines to be operated under widely varying speed ranges especially adapted for delivering high torque at low speed, the combination of a plurality of exhaust-gas-driven turbo-chargers each comprising an exhaust gas turbine and an air blower driven thereby, air delivery conduits connecting the blowers and the engine for conducting compressed air to the engine from the blowers in parallel, exhaust gas conduits having a separate connection with each turbine for conducting the engine exhaust to the turbines in parallel, a valve system in the conduits for controlling the flow of exhaust gases to the turbines, valve operating mechanism connected to the engine and operating in response to engine speed to cut off the flow of exhaust gas to one of the turbines at low engine speed, and to divert the exhaust gas supply to another turbine so that the speed thereof and the speed of the blower driven thereby is adequate to deliver air at higher pressure and in larger volumes at low engine speed than would be possible with all turbines and blowers operative.

JOHANN FÜLLEMANN.

REFERENCES CITED

The following references are of record in the file of this patent:

UNITED STATES PATENTS

| Number | Name | Date |
|---|---|---|
| 1,816,787 | Moss | July 28, 1931 |
| 1,856,024 | Büchi | Apr. 26, 1932 |
| 1,895,538 | Büchi | Jan. 31, 1933 |
| 2,296,268 | Büchi | Sept. 22, 1942 |
| 2,359,615 | Browne | Oct. 3, 1944 |
| 2,380,777 | Moss | July 31, 1945 |
| 2,384,381 | Jocelyn | Sept. 4, 1945 |

FOREIGN PATENTS

| Number | Country | Date |
|---|---|---|
| 479,278 | Great Britain | Jan. 28, 1938 |